(12) United States Patent
Donhauser (10) Patent No.: US 11,578,751 B2
(45) Date of Patent: Feb. 14, 2023

(54) COMPONENT ASSEMBLY COMPRISING A COMPONENT AND AN ELEMENT HAVING A HEAD PART AND A COLLAR ARRANGED AT ONE SIDE OF THE HEAD PART AS WELL AS MANUFACTURING METHODS

(71) Applicant: PROFIL Verbindungstechnik GmbH & Co. KG, Friedrichsdorf (DE)

(72) Inventor: Georg Donhauser, Amberg (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 636 days.

(21) Appl. No.: 16/397,643

(22) Filed: Apr. 29, 2019

(65) Prior Publication Data
US 2019/0338804 A1 Nov. 7, 2019

(51) Int. Cl.
*F16B 39/282* (2006.01)
*B23P 19/06* (2006.01)
*F16B 37/06* (2006.01)

(52) U.S. Cl.
CPC .......... *F16B 39/282* (2013.01); *B23P 19/064* (2013.01); *F16B 37/068* (2013.01)

(58) Field of Classification Search
CPC .... F16B 37/068; F16B 37/041; F16B 37/044; F16B 37/045; F16B 39/282; B23P 19/062; B23P 19/064; Y10S 411/968
(Continued)

(56) References Cited

U.S. PATENT DOCUMENTS 1,579,875 A 4/1926 Lundberg
1,759,339 A * 5/1930 Andren ................. F16B 37/065
411/180
(Continued)

FOREIGN PATENT DOCUMENTS

CA 2448716 A1 1/2003
DE 1906189 8/1970
(Continued)

*Primary Examiner* — Roberta S Delisle
(74) *Attorney, Agent, or Firm* — Gregory J. Gore, Esq.

(57) ABSTRACT

A component assembly is described which consists of a component and an element attached to the component and formed as an alignment element. The element has a head part, a component contact surface provided at an end face of the head part and a collar arranged inside the component contact surface and projecting away from it. The collar has a cross-sectional shape which is non-circular. The collar is inserted with clearance into an aperture of the component formed complimentary to the cross-sectional shape of the collar and has outer surfaces which converge in the direction of the said end face of the head part and with respect to the central longitudinal axis of the element and form an acute angle with the latter. The marginal region of the aperture of the component adjacent to the component contact surface extends into recesses formed between the collar and the end face of the head part but does not reach the base of the recesses, with a free space arising which ensures a lateral alignment movement of the element relative to the component. An axial separation of the element from the component is prevented as a result of material overlap of the component material with the collar within the recesses. Elements and methods for manufacture of the component assembly are also claimed.

17 Claims, 9 Drawing Sheets

(58) Field of Classification Search
USPC .................................. 411/172–176, 180, 181
See application file for complete search history.

(56) References Cited

U.S. PATENT DOCUMENTS

| | | | | | |
|---|---|---|---|---|---|
| 1,919,552 | A | * | 7/1933 | Hasselquist | ........... F16B 37/068 29/520 |
| 3,000,420 | A | * | 9/1961 | Spokes | ................ F16B 37/068 411/180 |
| 6,220,804 | B1 | | 4/2001 | Pamer | |
| 6,817,815 | B2 | * | 11/2004 | Ross | ..................... F16B 35/048 411/107 |
| 7,568,869 | B2 | * | 8/2009 | Wang | ................... F16B 37/061 411/171 |
| 7,878,746 | B2 | * | 2/2011 | Babej | ..................... B21K 1/702 411/179 |
| 8,021,091 | B2 | * | 9/2011 | Bentrim | ................ F16B 37/068 411/180 |
| 8,186,920 | B2 | * | 5/2012 | Shuart | ................... F16B 37/068 411/181 |
| 8,210,315 | B2 | * | 7/2012 | Diehl | ................ F01M 11/0408 184/1.5 |
| 2010/0135744 | A1 | * | 6/2010 | Babej | ................... F16B 37/068 411/172 |
| 2010/0209211 | A1 | * | 8/2010 | Babej | .................... B23P 19/062 411/173 |
| 2011/0211932 | A1 | | 9/2011 | Babej | |

FOREIGN PATENT DOCUMENTS

| | | |
|---|---|---|
| DE | 1725010 C2 | 2/1976 |
| DE | 102005001461 A1 | 8/2005 |
| DE | 102005007203 | 4/2006 |
| EP | 2016297 B1 | 3/2012 |

\* cited by examiner

COMPONENT ASSEMBLY COMPRISING A COMPONENT AND AN ELEMENT HAVING A HEAD PART AND A COLLAR ARRANGED AT ONE SIDE OF THE HEAD PART AS WELL AS MANUFACTURING METHODS

The present invention relates to a component assembly comprising a component and an element formed as an alignment element attached to the component, the element having a head part, a component contact surface at one end face of the head part and a collar arranged inside the component contact surface and projecting away from it, the collar having a cross-sectional shape which is not circular. Furthermore, the invention relates to an element which is adapted for use in such a component assembly and to methods of manufacturing such a component assembly.

A component assembly of the initially named kind can be found in US 2011/0211932 A1. There the element is formed as a press-in element which is introduced in a self-piercing manner into a sheet metal part, i.e. the press-in element cuts its own aperture in the sheet metal part and the sheet metal part is so upset on being attached to the sheet metal part that the sheet metal material is pressed over the full area into an undercut formed between the polygonal collar and the sheet metal part, whereby the press-in element is secured in a fixed position at the sheet metal part in a manner secured against loss. A further sheet metal part can then be attached to the first sheet metal part and indeed by means of bolts which are screwed into the press-in elements in the first sheet metal part. Similar component assemblies can be seen from the further documents U.S. Pat. No. 6,220,804 and CA-A-2 448 716. The procedure mentioned directly above in this paragraph assumes that the apertures in the further sheet metal part are well aligned with the press-in elements in the first sheet metal part. This is not always simple to ensure which is why one wishes to make use of so-called alignment elements.

In such alignment elements the nut element sits loosely within a sheet metal cage which is welded to the sheet metal part. A hole is provided in the sheet metal part beneath the nut element and is significantly larger in diameter than the bolts. In this way the press-in element can be displaced sideways in order to ensure the necessary alignment of the bolts with the nuts.

The principal object of the present invention is to provide a component assembly of the initially named kind and also a suitable element for use in the component assembly and corresponding manufacturing methods, with the element being alignably movable in the component and thus being able to be considered an alignment element and indeed without the element having to be accommodated in the sheet metal cage, whereby the sheet metal cage and the corresponding welding process, which is in any event not possible at all for some components such as composite sheet metal parts, can be avoided.

This object is satisfied in accordance with the invention, in a component assembly of the above named kind, wherein the collar is inserted with clearance in an aperture of the component shaped complementary to the cross-sectional shape of the collar, wherein the collar has outer surfaces which converge in the direction towards the said end face of the head part and with respect to the central longitudinal axis of the element form an acute angle with the latter, wherein the marginal region of the aperture of the component adjacent to the component contact surface extends into recesses formed between the collar and the end face of the head part but does not extend to the base of the recesses, with a free space arising which ensures a lateral alignment movement of the element relative to the component and wherein an axial separation of the element from the component is prevented by material overlap of the component material with the collar or with the outwardly turned end of the collar within the recesses.

In the present invention the element is preferably provided as a press-in element, it could however also be designed as a rivet element. In that case the free end of the collar is formed in such a way that it could be turned radially outwardly in order to form a rivet bead, for example by forces exerted on it during the attachment of to the component. If the element is realized as a rivet element then the design should also correspond to that described in the preceding paragraph, i.e. the collar will again be inserted with clearance in an aperture of the component shaped complementary to the cross-sectional shape of the collar, the collar will have outer surfaces which converge in the direction towards the said end face of the head part and with respect to the central longitudinal axis of the element form an acute angle with the latter, and the marginal region of the aperture of the component adjacent to the component contact surface will extend into recesses formed between the collar and the end face of the head part but will not extend to the base of the recesses, with a free space arising which ensures a lateral alignment movement of the element relative to the component and an axial separation of the element from the component is prevented by material overlap of the component material with the collar within the recesses.

A plurality of possibilities exist for providing the collar of the element and the aperture of the component with a non-circular cross-section. It is particularly favorable when the collar has an at least substantially polygonal cross-sectional shape, with the polygonal cross-sectional shape of the collar and accordingly of the polygonal aperture of the component being selected from the group triangular, square, pentagonal and hexagonal. The cross-sectional shape of the collar and of the aperture is preferably made square, in particular with rounded corners. The square shape enables an excellent alignment movement in two directions of right angles to one another related to the local plane of the component in the region of the attachment of the element and the rounded corners ensure that the danger of fatigue cracks in the corner regions of the aperture in the component can be significantly reduced. Moreover, good security against rotation can be ensured in this way so that the element could only be twisted out of the component using destructional forces.

Such shapes, which are in principle all known from the initially named US 2011/0211932 A1 ensure that an adequate security against rotation can be achieved which progressively reduces on providing a larger number of flanks or side surfaces. The decisive distinction is however that in US 2011/0211932 A1 the collar is firmly surrounded by component material in the sense of a strangle hold, which is also the case in the other documents belonging to the prior art.

A further alternative cross-sectional shape consists in that the collar has an oval or elliptical shape. A cross-sectional shape of the collar and of the aperture in a similar manner to an ice cream container, with a square or rectangular central region and with semi-circular extensions at two oppositely disposed sides of the central region, can also be considered. Such cross-sectional shapes, i.e. an elliptical cross-sectional shape or a cross-sectional shape like an ice cream container enable good alignment movements with reduced danger of fatigue and excellent characteristics with regard to security against rotation.

Since the polygonal aperture in the component or in the sheet metal part is preformed it can be made sufficiently large that the polygonal collar can be inserted into the polygonal aperture at its free end face which has the largest cross-sectional dimensions. Through intentional upsetting of the component or of the sheet metal part, component material or sheet metal material in the marginal region of the polygonal aperture at the side adjacent the component contact surface of the part can be pressed into the recesses formed between the converging outer surfaces of the collar and the component contact surface of the head part, or the sheet metal contact surface of the element. The upsetting takes place in such a way that the material overlaps the collar in the radial direction and thus prevents the element being pulled out of the component out of the sheet metal part but is not pressed in the radial direction into the recesses to such an extent that the element is laterally firmly held. Instead it is upset such that a lateral spacing exists relative to the basis of the recesses so that a free space arises and the lateral alignment movement of the element is still present and indeed preferably in all lateral directions. The same advantages can also be achieved with an elliptical or ice cream container like cross-sectional shape of the collar and of the aperture by means of an intentional upsetting of the component or of the sheet metal part.

No features providing security against rotation in the form of projecting noses or ribs or corresponding recesses are preferably provided at the element which could prevent the displaceability of the element because it has been recognized in accordance with the invention, that the required security against rotation can be achieved to an adequate degree and exclusively by the polygonal shape of the aperture and that of the collar and indeed even when a certain mutual rotatability of the element and of the component is unavoidable as a result of the radial alignment movement. The same applies to the elliptical or ice cream container like cross-sectional shape of the collar and of the aperture.

The acute angle between the outer surfaces of the collar and the central longitudinal axis of the element preferably lies in the range from about 20° to about 40°. An angle which is too small restricts the radial alignment movement of the element and reduces the security against press-out, whereas an angle which is too large makes it more difficult to achieve the desired direct clamping of the further sheet metal part without the head part of the element and the head part of the bolt element having to be undesirably increased in size. When it is stated here that the shape is at least substantially polygonal this signifies that the corners between adjacent side surfaces or flanks can be rounded which favors the fatigue behavior of the component assembly.

The head part of the element is preferably polygonal in shape and indeed has the same number of flanks as the collar which is polygonal in cross-section. This simplifies the manufacture of the element, for example by a cold heading process, and ensures that the sheet metal contact surface which is formed by the component contact surface has a uniform shape. Alternatively, for an element having a collar with elliptical or ice cream container-like cross-sectional shape, one could however use a head shape having a corresponding cross-sectional shape. Alternatively, a head shape which is circular in cross-section could be selected for all variants of the collar.

In any event the head part can also be rounded in sideview, a type of shape which can easily be realized during a cold heading process. Furthermore, elements with such a shape can also be processed in known setting heads of the applicants, which their customers have, in a cost-saving manner.

A possibility of displacing the component material radially in the marginal region of the polygonal aperture lies in providing the side of the head part adjacent to the polygonal collar with projecting displacement surfaces at a position of the flanks of the polygonal collar. These displacement surfaces serve, on supporting the component on a planar surface or on a die button having a flat end face, and on exerting pressure on the head part element to bring about the desired displacement of the component material. In this way the stent of the radial displacement of the component material is determined by the volume of the projecting displacement surfaces. The volume of the projecting displacement surfaces is determined by their radial and peripheral extent and also their axial height. In this connection the axial height should be kept as small as possible because this leads to an axial recess in the side of the component opposite to the component contact surface of the head part which can prevent or unfavorably influence the radial alignment movement of the element. Corresponding displacement surfaces can also be provided at the component contact surface of an element with a different cross-sectional shape, for example with an elliptical or ice cream container-like cross-sectional shape.

The elements in accordance with the invention can either be formed as a nut element and have a central longitudinal passage, or can be formed as a bolt element with a shaft part which extends away from the collar and in the direction away from the head part.

The central longitudinal passage of the nut element can be provided with a thread cylinder or can have a smooth cylindrical bore which can be reshaped to a thread cylinder by means of a thread cutting or thread forming bolt.

An alternative to this, the component assembly can be so formed that the said side of the head part, i.e. the component contact surface, lies in a plane perpendicular to the central longitudinal axis of the element and that the displacement of the component material takes place in a different manner.

This can for example take place in accordance with the invention in such a way that a ring recess is provided in the side of the component remote from the component contact surface of the head part around the polygonal aperture, or in that discrete recesses are provided which are arranged in a ring inside of the component remote from the component contact surface of the head part around the polygonal aperture, which is or are responsible for the displacement of the component material into the recesses between the collar and the component contact surface.

A method in accordance with the invention for manufacturing a component assembly of the invention as described above can be so designed in that a non-circular aperture is pre-formed in the component having transverse dimensions larger than the corresponding maximum transverse dimensions of the collar in the region of its free end face, so that the collar can be introduced into the non-circular aperture, in that component material is displaced from the marginal region of the non-circular aperture into the recesses formed between the side surfaces of the collar and the component contact surface of the head part, with the component material not being displaced sufficiently far that it extends to the base of the recesses, whereby the lateral alignment movement of the element relative to the component is ensured, but extends only so far that an axial separation of the element from the component is prevented as a result of the material overlap of the component material with the non-circular collar inside the recesses.

In a specific preferred embodiment of the above-described method of the invention the pre-formed non-circular aperture of the component is provided with a raised marginal region at the side remote from the component contact surface of the head part with the raised marginal region being pressed flat on introducing the collar into the component by the component contact surface of the head part while the component is simultaneously supported at the side remote from the head part, in order to hereby bring about the displacement of the component material in the marginal region.

In an alternative embodiment of the method in accordance with the invention the marginal region of the pre-formed aperture of the component, which lies in a plane in the region of attachment of the element is impressed by means of displacement surfaces which are provided at the component contact surface of the head part, at least in the region of the side flanks of the collar by the component contact surface of the head part with simultaneous support of the underside of the component, in order to hereby bring about the displacement of the component material in the marginal region into the recesses.

In a further alternative embodiment of the method of the invention, by means of a die which is provided with a raised ring or with discrete projections arranged in a ring, a ring recess or discrete recesses which are arranged in a ring is or are provided at the side of the component remote from the component contact surface of the head part around the non-circular aperture and is or are responsible for the displacement of the component material into the recesses.

It is particularly favorable when a method for the manufacture of a component assembly in accordance with the invention as defined in at least one of the corresponding patent claims 1 to 10 is used in which, by the exertion of pressure on the head part of the element and with a simultaneous support of the component on a die button having a non-circular central aperture, the free end of the collar which is non-circular in cross-section is used in order to punch a non-circular aperture in the component. I.e. the element is introduced in self-piercing manner into the component with the method in accordance with the invention taking place in one step and thus being able to be carried out in a particularly economical time-saving manner. Furthermore, in this manner problems with the alignment of the element or of its collar and the component can be avoided because the collar cuts its own shape-matched aperture in the component and the specific orientation of the collar around such longitudinal axis of the component is completely unimportant. The upsetting of the component material can in this arrangement take place in accordance with one of the above described ways.

It is particularly favorable in the last named method when the non-circular aperture of the die button is provided with cross-sectional dimensions somewhat larger than the corresponding cross-sectional dimensions of the free end face of the collar so that the sidewalls of the so punched aperture of the component are divergent in the direction of the central longitudinal axis of the element and in the direction away from the head part, at least in the region remote from the head part. In this way a significant increase of the alignment movement can be achieved.

The invention will now be explained in more detail in the following with reference to the embodiments which are shown in the Figures. In the Figures there are shown.

Figure 1A:
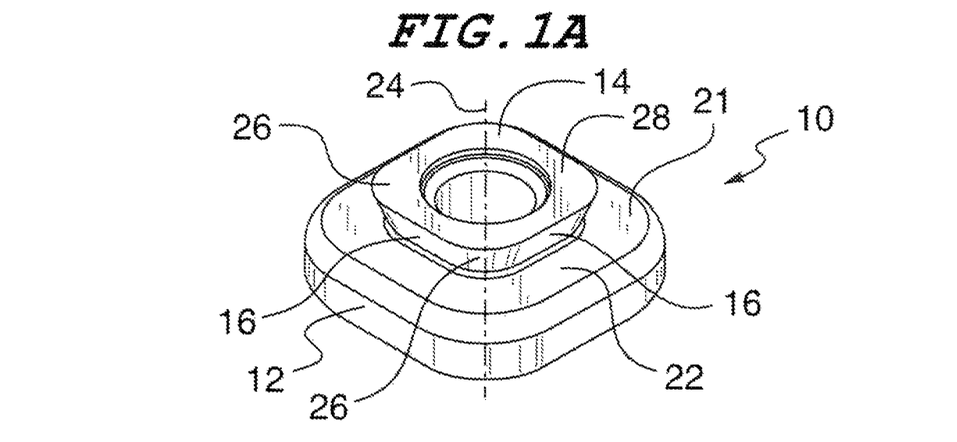
FIGS. 1A to 1C a press-in element in accordance with the invention in the form of a nut element and indeed in a perspective view (FIG. 1A), in a view which is sectioned in a plane at the left hand side of the central longitudinal axis and is shown in a sideview to the right hand side of the central longitudinal axis (FIG. 1B) and also in the half view from below (FIG. 1C), FIGS. 2A and 2B two drawings which show the introduction of the press-in element in accordance with FIGS. 1A to 1C into a sheet metal part, FIGS. 3A to 3C views, corresponding to the views of the FIGS. 1A to 1C but from a modified press-in element in accordance with the invention, also in the form of a nut element, but with displacement surfaces beneath the head part, FIGS. 4A and 4B two drawings which show the introduction of the press-in element in accordance with FIGS. 3A to 3C into a sheet metal part, FIGS. 5A and 5B two drawings which show an alternative method for the introduction of the press-in element in accordance with FIGS. 1A to 1C into a sheet metal part, FIGS. 6A to 6C views, corresponding to the views of FIGS. 1A to 1C but of a modified press-in element in accordance with the invention in the form of a bolt element, FIGS. 7A and 7B two drawings which show the introduction of the press-in element in accordance with FIGS. 6A to 6C into a sheet metal part, FIGS. 8A an d8B drawings in order to make clear to further possible cross-sectional shapes of a press-in element and correspondingly of a non-circular aperture of a component, and FIG. 9 a schematic drawing in order to illustrate the self-piercing introduction of a press-in element in accordance with the invention.
Figure 1B:
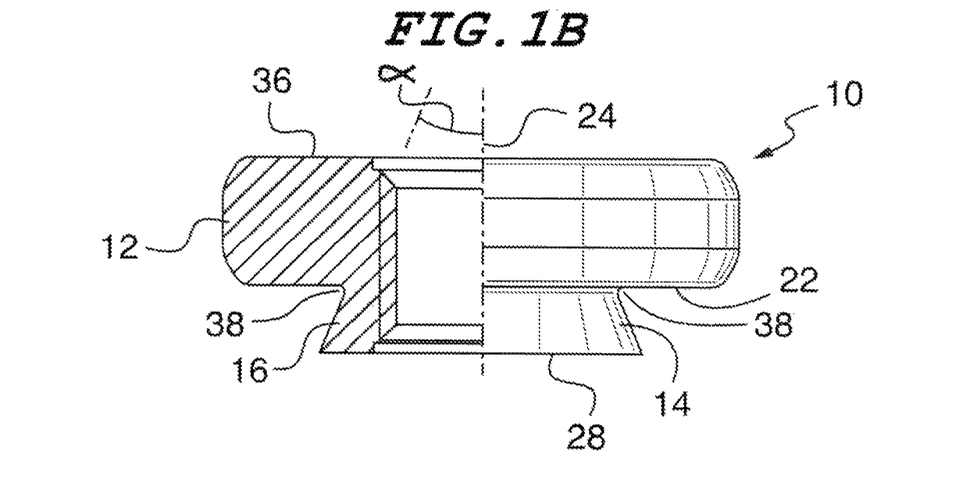
Figure 1C:
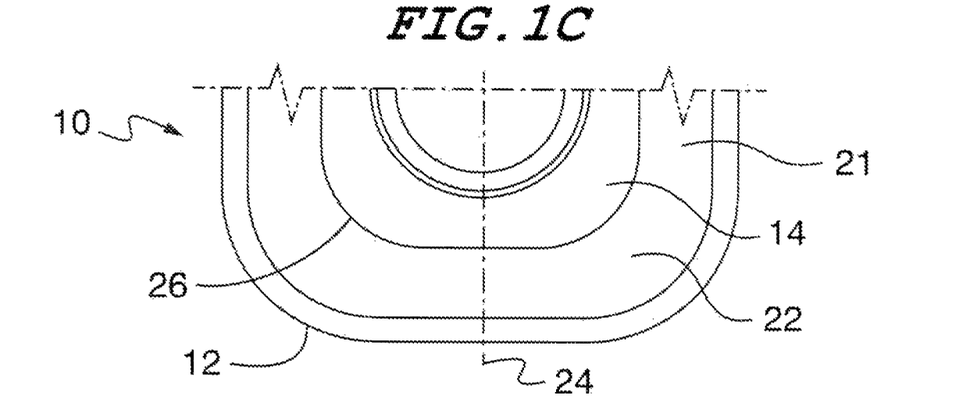
Figure 2A:
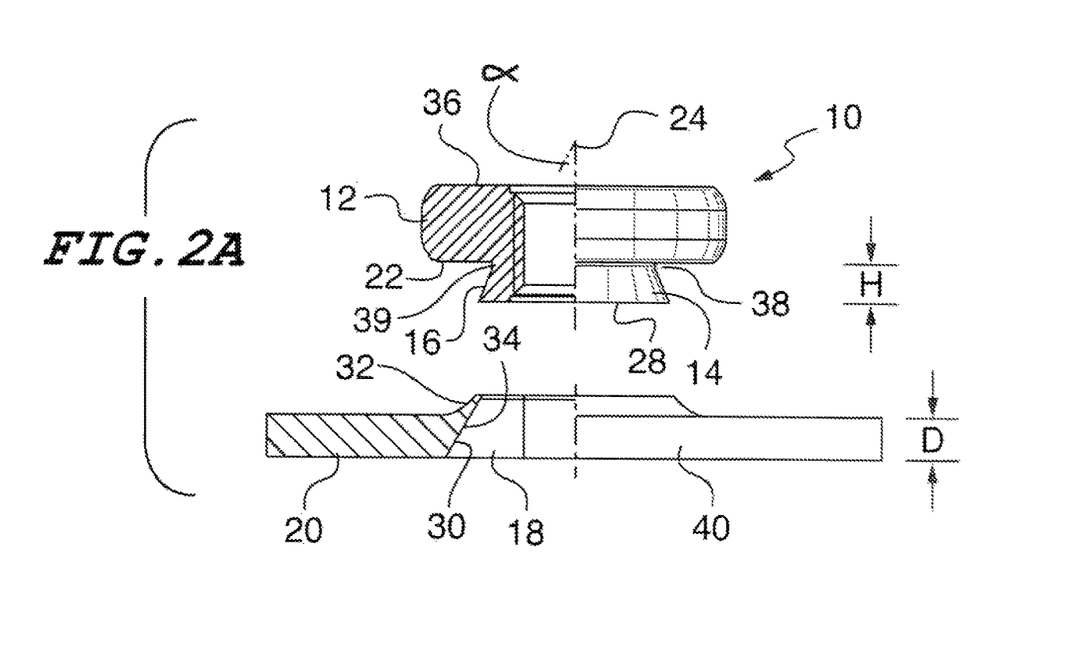
Figure 2B:
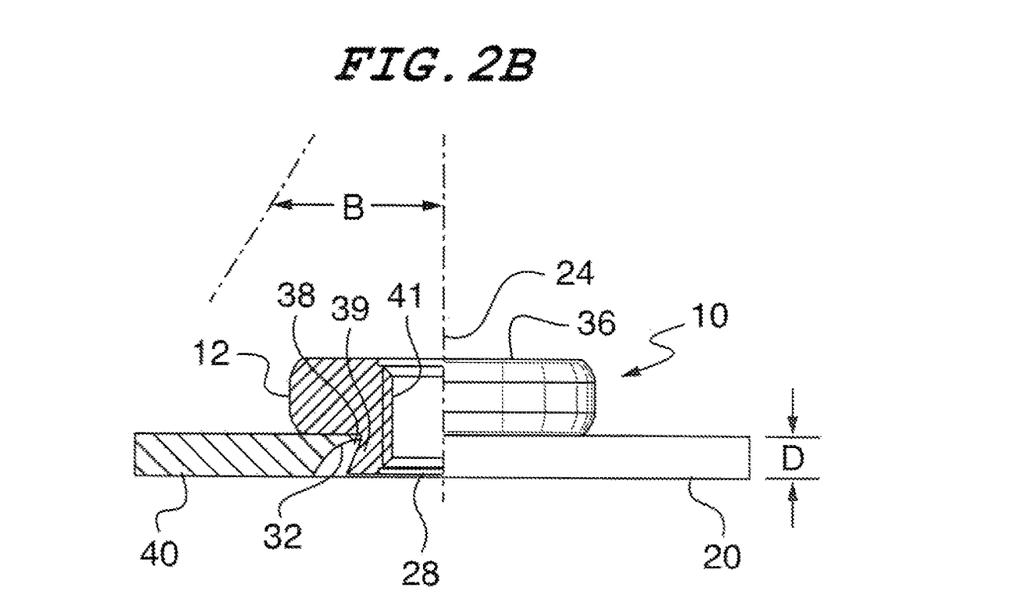

With reference to FIGS. 1A to 1C and also to FIGS. 2A and 2B a press-in element 10 is shown with a head part 12 and an at least substantially polygonal collar 14 arranged at one side of the head part. For the formation of an alignment element the outer flanks 16 of the polygonal collar 14 which is designed for an insertion into a correspondingly preformed polygonal aperture 18 of a panel 20, which is for example shown in FIG. 2A, are so designed that they converge in the direction towards the underside 22 of the head part 12 and with respect to the central longitudinal axis 24 of a press-in element 10 and form an acute angle α with this. The underside 22 of the head part 12 in this embodiment forms the component or sheet metal contact surface 21 of the press-in element 10. The axial height H of the collar 14 should preferably not exceed the thickness D of panel 20 in the region of the attachment of the press-in element 10. The end face 22 of the component 12 preferably lies in a plane perpendicular to the central longitudinal axis 24 of the press-in element 10.

The acute angle α preferably lies in the range from about 20° to about 40°.

In all the embodiments shown the cross-section of the collar 14 and the polygonal aperture 18 is rectangular with rounded corners 26. The cross-section of the collar 14 and the shape of the aperture 18 are the same but do not necessarily have to be rectangular. The at least substantially polygonal cross-section of the collar 14 and accordingly the polygonal aperture 18 in the panel 20 could for example be selected from the group comprising triangular, square, pentagonal and hexagonal or oval, as is for example known from US 2011/0211932 A1.

In all the embodiments shown here the head part 12 is polygonal in cross-section and indeed with the same polygonal shape as the collar 14.

The FIGS. 2A and 2B show the preferred method in order to attach the press-in element 110 to the panel 20. The polygonal aperture 18 is first pre-manufactured in the panel in a separate operation and indeed with cross-sectional dimensions larger than the maximum cross-sectional dimensions of the polygonal collar 14 in the region of its free end face 28, so that it can be introduced into the polygonal aperture. The manufacture of the aperture 18 can for example be carried out separate from the attachment of a press-in element in a press which stands in a different factory or in a different building or at a different place in the same building where the pressing in of the press-in element takes place. The insertion or the pressing in of the press-in element 10 can itself take place in a press or by means of a robot or by using a caliper in particular a motor-driven caliper. As an alternative to this the formation of the polygonal aperture can take place in the same press as the insertion of the press-in element. This is normally achieved in such a way that progressive tooling (not shown) is used in the press.

When using progressive tooling the polygonal aperture 18 is carried out in one station of a progressive tool while the introduction of the press-in element is carried out in a further station of the progressive tool. For each stroke of the press a polygonal aperture is punched out in the one station of the progressive tool and a press-in element inserted in the further station into the polygonal aperture which was manufactured in an earlier working stroke of the press. As is well known per se, the work pieces, i.e. either individual components 20 or a strip consisting of a plurality of initially interconnected workpieces or components 20 (panels) are transported further by a preset distance within the progressive tooling for each stroke of the press.

As can be seen from FIG. 2A the pre-forming of the aperture of the sheet metal part is effected in such a way that the aperture 18 has obliquely arranged side flanks 30 which likewise form an acute angle β with the central longitudinal axis and which converge going in the direction towards the head part 12, with β being able to be selected to be same as or different from α. Furthermore, β can also be selected to be 0. A pre-formed aperture 18 is surrounded by a projecting lip 32, i.e. by a raised ring region which can be produced during the manufacture of the polygonal aperture 18 by means of a correspondingly shaped die button (not shown). In this example the radially inner flank 34 of the lip 32 continues the obliquely set side flanks 30 at the same angle β. The transverse dimensions of the aperture 18 at the narrowest point, i.e. at the top in FIG. 2A, are made slightly larger in comparison to the maximum transverse dimensions of the collar 14, i.e. at the bottom of FIG. 2A, so that the collar 14 can be inserted at least substantially free of clearance into the pre-formed aperture 18. Thereafter, by exerting pressure onto the upper end face 36 of the head part 12 while simultaneously supporting the sheet metal part 20 on a planar surface of a tool, or on the planar surface of a die button, the lip 32 can be pressed flat into the shape 32' shown in FIG. 2B, whereby the sheet metal material of the lip 32 is displaced into the recesses 38 between the side flanks 16 of the collar 14 and the lower side 22 of the head part. The panel material is however not displaced sufficiently far that it reaches the base 39 of the recesses, but rather a free space 41 remains between the lips 32' after these have been pressed flat and the base 39 of the recesses 38. In this way, a lateral alignment movement of the press-in element 10 relative to the panel 20 is ensured. The displacement however takes place to such an extent that an axial separation of the press-in element 10 from the panel 20 is prevented as a result of the material overlap of the panel material, i.e. of the lip 32', with the polygonal collar 14 within the recesses 38. The expression "material overlap" means here, that the smallest dimensions of the aperture 18, here in the region of the top side of the flat pressed lip 32' are smaller than the maximum transverse dimensions of the non-deformed collar 14, whereby the nut element 10 cannot be pulled out of the sheet metal part 20 and pressing out of the nut element 10 from the sheet metal part 20 is prevented, or is only possible with deforming forces. A movement of the press-in element further downward in FIG. 2B is not possible because the component contact surface 21, which is larger than the aperture 18, prevents a movement of this kind.

One can see from FIG. 2B that the free end face 28 of the collar 14 in the installed state of the press-in element extends at a maximum only to the lower side 40 of the sheet metal part 20 and indeed preferably stands slightly above the lower side 40 of the sheet metal part 20, for example by 0.02 mm. In this way, the desired direct clamping between the sheet metal part 20 and a further component or a housing, which takes place at the sheet metal part 20, is achieved by means of a bolt (not shown) screwed into the nut element. Furthermore, this prevents the further component being movably held relative to the component 20, which would be the case if the axial height of the collar 14 were larger than the thickness of the sheet metal part 20. It would admittedly be possible to make the axial height of the collar 14 larger than the thickness of the sheet metal part 20 and to overcome the corresponding disadvantages by a specially shaped washer, this is however a substantial complication because an extra part would be necessary. Furthermore, the head part 12 of the press-in element 10 and of the element which is screwed to it would, under some circumstances, have to be made larger than would otherwise be necessary.

Finally, one can see from FIGS. 2A and 2B that no deformation of the press-in element 10 takes place which is why the designation "press-in element" is justified, since, in contrast to a rivet element for which an intentional deformation of the rivet element takes place when it is attached, no deformation is desired.

In this embodiment it is particularly favorable that in the installed state of FIG. 2B the upper side of the sheet metal part 20 lies in one plane and thus does not hinder the alignment movement of the press-in element.

Although it is desired per se in an alignment element that the press-in element 10 is secured to the sheet metal part 20 so that it cannot be lost before a further component is screwed into place, which is why the lip 32 is pressed flat in the embodiment of FIG. 2B, in order to generate the material overlap mentioned above prior to the attachment of the further component and so to achieve a component assembly which can be transported, this is not absolutely essential. It would for example also be conceivable that the lip 32 is first pressed flat when a further component is screwed into place through the force of the corresponding threaded bolt.

It can be seen from the foregoing that the pre-formed polygonal aperture 18 of the panel 20 is provided with a raised marginal region (lip) 32 at the side 46 adjacent to the component contact surface 21 of the head part 12 and that on the introduction of the collar 14 into the panel 20 the raised marginal region 32 (i.e. the lip 32) is pressed flat or compressed by the said side 22 of the head part while the underside of the panel 20 is simultaneously supported, in order to bring about the displacement of the panel material in the marginal region.

An alternative design of the press-in element 10 and of the method for the attachment of the press-in element into the sheet metal part will now be explained with reference to FIGS. 3A to 3C, 4A and 4B. Parts or features which have the same shape or function as in the previous embodiment in accordance with FIGS. 1A to 1C and 2A and 2B will be provided with the same reference numerals and it will be understood that for these reference numerals the same description applies as previously unless something to the contrary is stated. This convention also applies to the further embodiments and only parts or features which differ in their shape or function from the previous parts or features will be especially described.

In the embodiment of FIGS. 3A and 3C, 4A and 4B the press-in element 10 differs from the previous element solely in that the side 22 of the head part adjacent the polygonal collar 14 has projecting displacement surfaces 42, at least at the positions of the side flanks 16 of the polygonal collar 14 which are provided to displace panel material in the marginal region of the polygonal aperture 18. The displaced panel material flows radially into the recesses 38 formed between the side surfaces 16 of the polygonal collar 14 and the side 22 of the head part 12, or the displacement surfaces 42, and prevents an axial separation of the press-in element 10 and of the panel 20 of the sheet metal component. A further distinction to the embodiment in accordance with FIGS. 2A and 2B can be seen in the fact that in FIGS. 4A and 4B the sidewalls 30 of the polygonal aperture 18 here stand perpendicular to the upper side 46 and to the lower side 40 of the sheet metal part 20, i.e. the angle β is equal to zero. Nevertheless, the displacement of the sheet metal material in the region around the polygonal aperture 18 is sufficient in order to form the lip 32' and to ensure the above-mentioned material overlap. In this case also the lip 32' can be formed by the exertion of pressure onto the upper end face 36 of the head part of the press-in element 10 while simultaneously supporting the sheet metal part 20 at its lower side 40, but has the disadvantage that the impression caused by the displacement surfaces 42 in the upper side of the sheet metal part can hinder simple radial displaceability of the press-in element, without however completely preventing it, in particular since the press-in element also has a certain axial displaceability. In this case it is also not absolutely essential to attach the press-in element so that it is non-losably held at the sheet metal part 20 before the further component (not shown) is attached. In this case, the displacement of the sheet metal part by the displacement surface 42 could first be brought about on the attachment of the further sheet metal part by the force of the corresponding bolt, which is screwed into the internal thread 44 of the female press-in element 10. Until the displacement of the sheet metal material has taken place and the impression of the displacement surfaces 42 has been formed the lateral displaceability of the press-in element is present to the full extent. Optionally, in this embodiment, the side flanks 30 of the polygonal aperture could be arranged so that they converge at an acute angle β to the central longitudinal axis and in the direction of the head part 12 of the press-in element 10 (as is for example shown in accordance with FIGS. 5A and 5B).

Figure 5A:
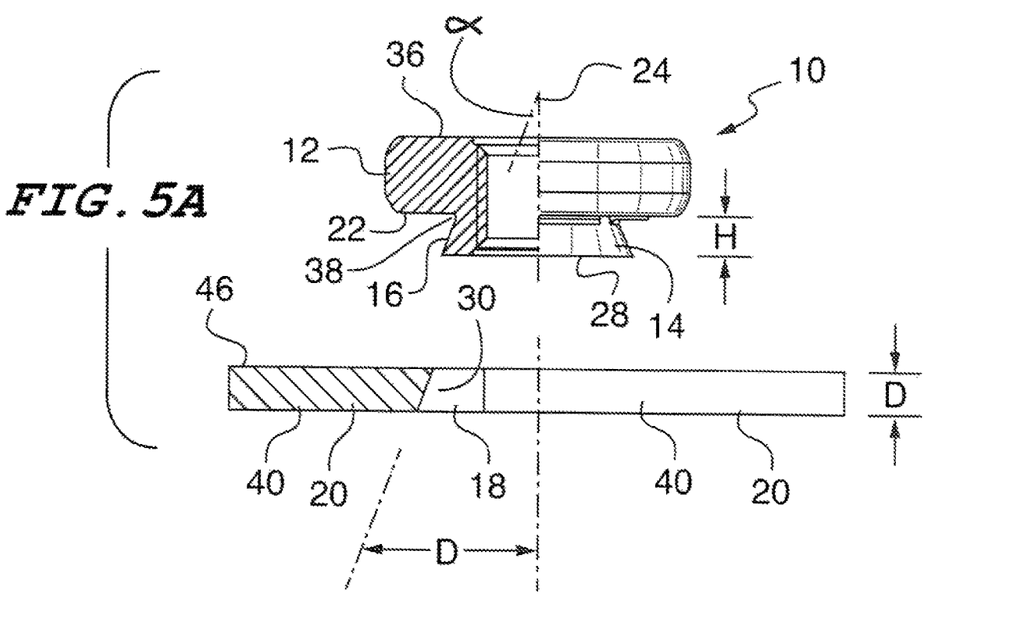
Figure 5B:
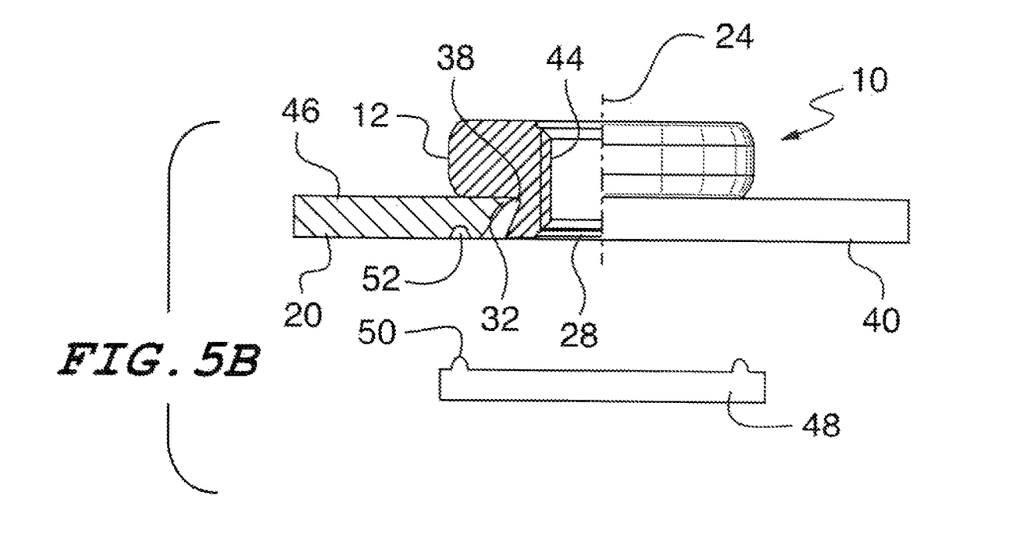
Figure 6A:
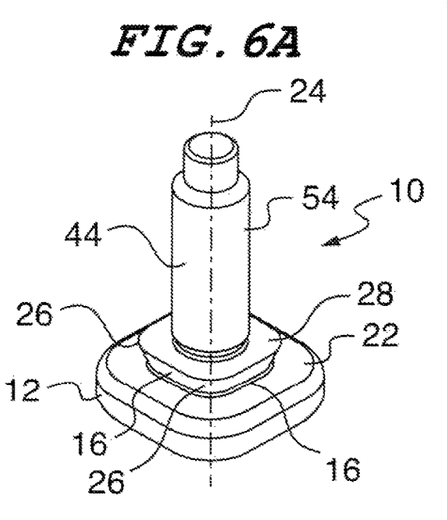
Figure 6B:
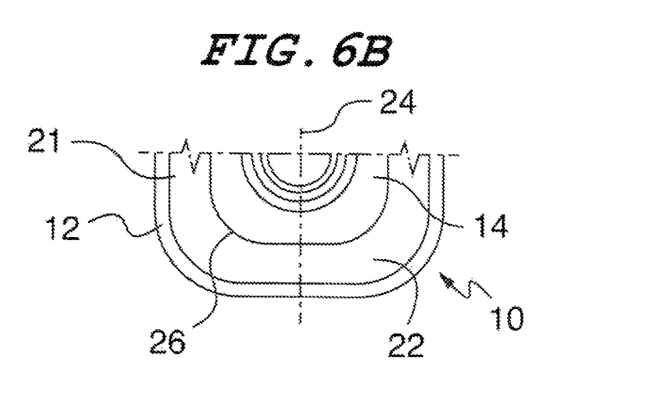
Figure 6C:
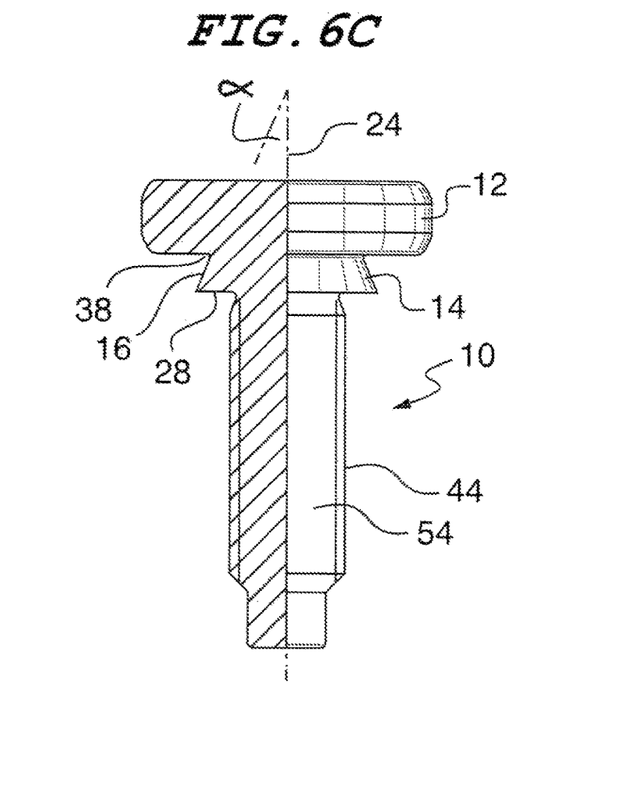
Figure 7A:
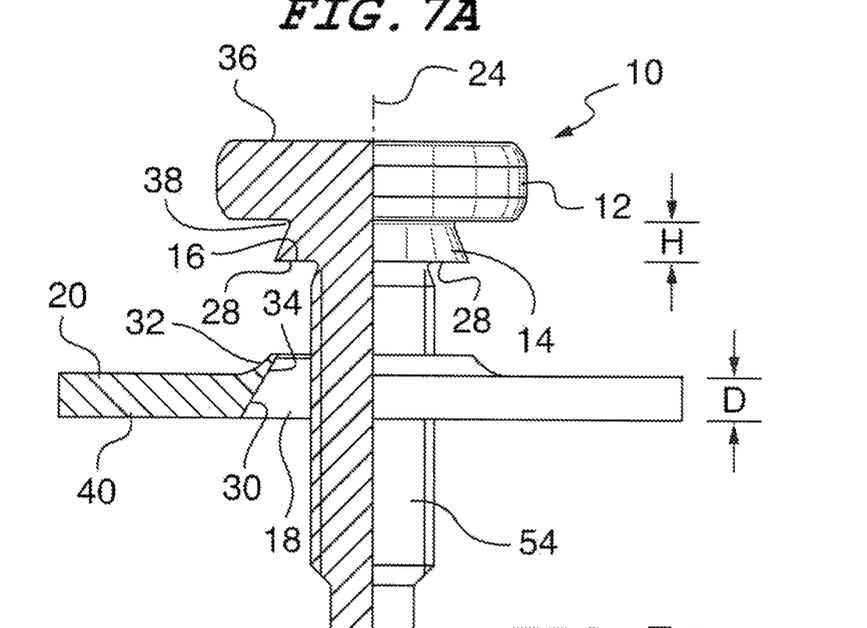
Figure 7B:
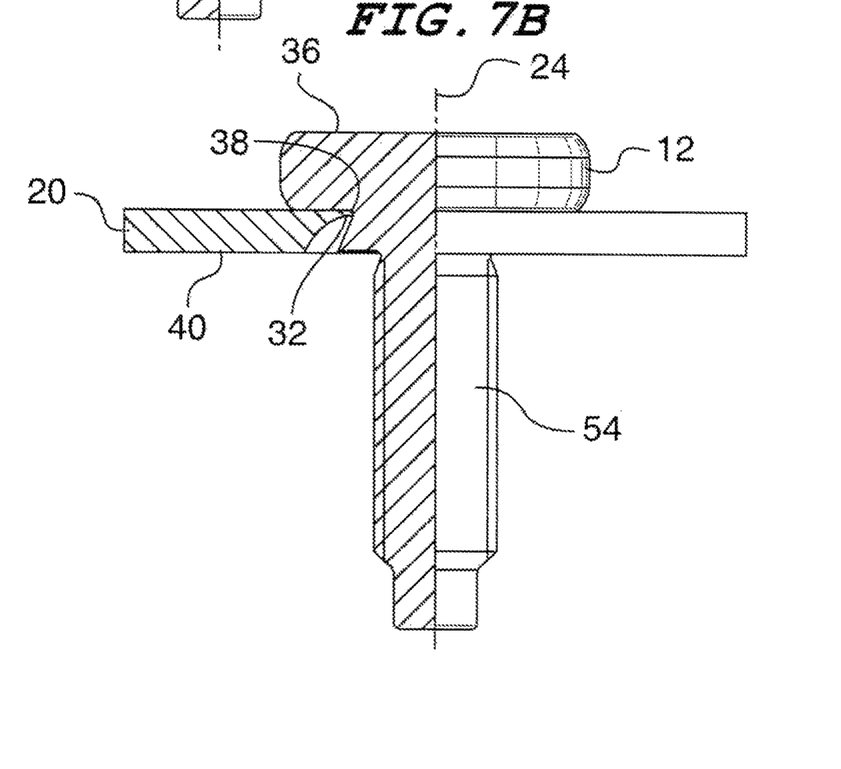

In the embodiment in accordance with FIGS. 5A and 5B the side surfaces 30 of the polygonal aperture 18 are arranged convergently with an acute angle β to the central longitudinal axis and in the direction towards the head part 12 of the press-in element 10, with the upper side 46 of the sheet metal part lying in one plane, at least in the region of the attachment of the press-in element 10. In this example, the lip 32' is produced by the displacement of sheet metal material at the underside 40 of the sheet metal part 20. As is indicated in FIG. 5B this takes place by a die button 48 with a ring-like raised portion 50 which produces a correspondingly shaped ring-like recess 52 in the lower side of the sheet metal part 20. Instead of a ring-like recess 52 discrete recesses which are arranged in a ring in the lower side 40 of the sheet metal part 20 around the polygonal aperture 18 can be used. In this connection the die button 48 must have corresponding discrete projections (not shown, but corresponding in shape to the cross-section of the ring-like raised portion 50) which are responsible for the displacement of the panel material 32' into the recesses 38. This displacement takes place when the sheet metal part is squashed between the surface 22 of the head part and the die button 48 by pressure exerted on the upper end face 36 of the head part, for example in a press.

In all the previous embodiments the press-in element is realized as a nut element with a centrally arranged thread cylinder or internal thread 40.

The press-in element 10 could however also be realized as a bolt element 10 as is shown in FIGS. 6A to 6C, 7A and 7B. There the press-in element 10 is provided with a shaft part 54 with an external thread 44 which extends away from the side of the collar 14 remote from the head part 12 in the direction of the central longitudinal axis 24, i.e. with a shaft part 54 with an external thread 44 instead of a hollow passage with an internal thread 44. Otherwise, the bolt element corresponds to the nut element in accordance with FIGS. 1A to 1C. The sheet metal preparation in accordance with FIG. 7A and the press-in situation in accordance with FIG. 7B also correspond to the sheet metal preparation in accordance with FIG. 2A and the installation situation in accordance with FIG. 2B.

It would also be entirely possible to realize the design of the bolt element 10 and of the sheet metal preparation in a different manner. For example, the design of the head part 12 and of the collar 14 of the bolt element 10 and also the sheet metal preparation and the installation situation could correspond to that of the examples in accordance with FIGS. 3A to 3C and 4A and 4D. As a further example, the design of the head part 12 and of the collar 14 of the bolt element and also the sheet metal preparation and the installation situation could correspond to the examples in accordance with FIGS. 1A to 1C and 5A and 5D.

Irrespective of whether one works with a press-in element 10 in the form of a nut element or in the form of a bolt element, a component assembly results consisting of the press-in element 10 in combination with the panel 20, in particular in the form of a sheet metal part, with the collar 14, which is at least substantially polygonal in cross-section, being laterally displaceably located in the polygonal aperture 18 of the panel 20 and with panel material from the marginal region of the aperture 18 extending into the recesses or notches 38 formed between the polygonal collar 14 and the underside of the head part, but not extending up to the base of the recesses 38, whereby the lateral displaceability of the press-in element relative to the panel 20 is ensured, but an axial separation of the press-in element 10 from the panel 20 is prevented as a result of the material overlap of the panel material with the polygonal collar 14 within the recesses 38.

In the component assembly the panel material is displaced from the marginal region of the polygonal aperture 18 into the recesses 38 when displacement surfaces 42 are provided at the side of the head part and are pressed into the panel material.

Figure 8A:
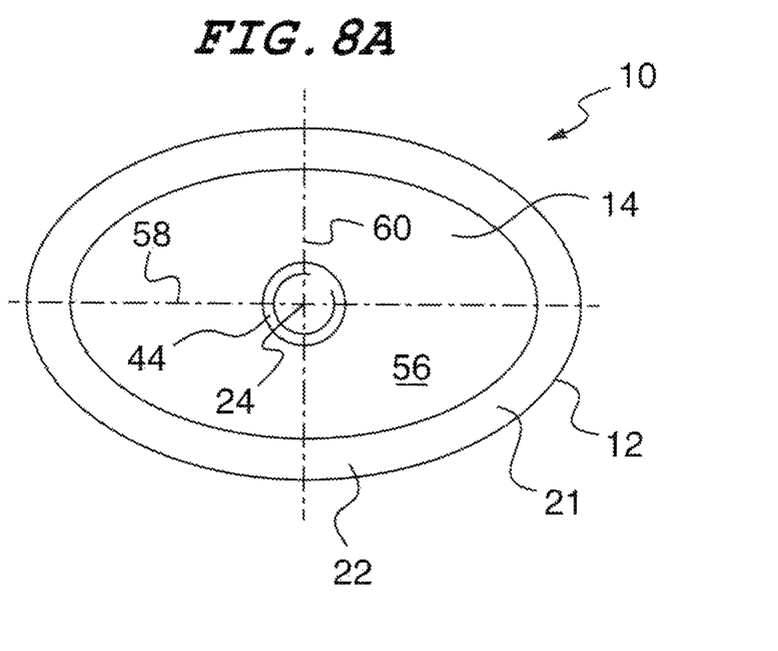
Figure 8B:
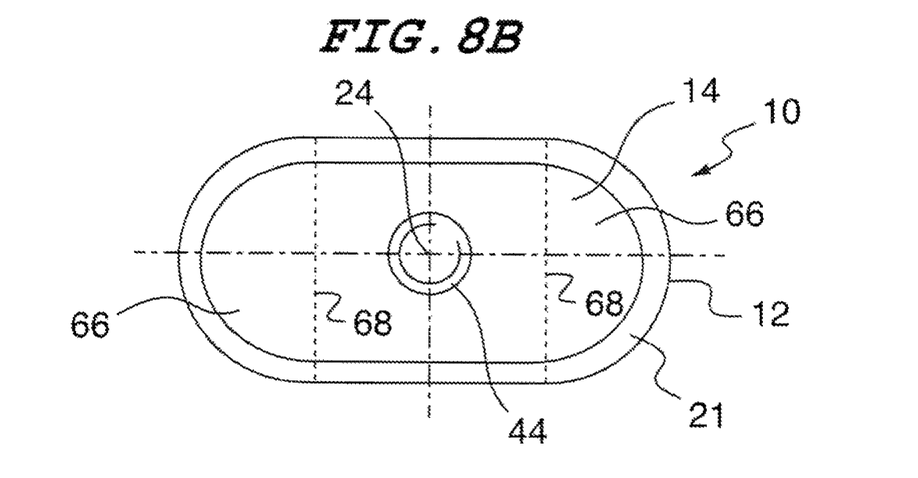

With reference to FIGS. 8A and 8B two different examples for non-circular cross-sectional shapes of a collar 14 and of the respectively associated head part 10 of a press-in element are shown. It will be understood that the aperture 18 in the component (not shown) is selected to have a shape complementary to the cross-sectional shape of the collar 14.

In FIG. 8A the cross-sectional shape is elliptical 56 with a major axis 58 and with a minor axis 60. In FIG. 8B the cross-sectional shape resembles in ice cream container 62 with a central square or rectangular region 64 and semicircular extensions 66 at two opposite imaginary sides 68 of the central region 64. The sides 68 are shown here in broken lines because they are not physically visible because of course the collar is a single piece of material instead the sides 68 are simply imaginary sides to facilitate a description of the part itself. In both cases the head part 12 of the press-in element 10 has the same shape as the respective collar 14, with the extent of the head part 12 being larger than that of the collar, in order to form the component contact surface 21 at the lower side 22 of the head part.

Figure 3A:
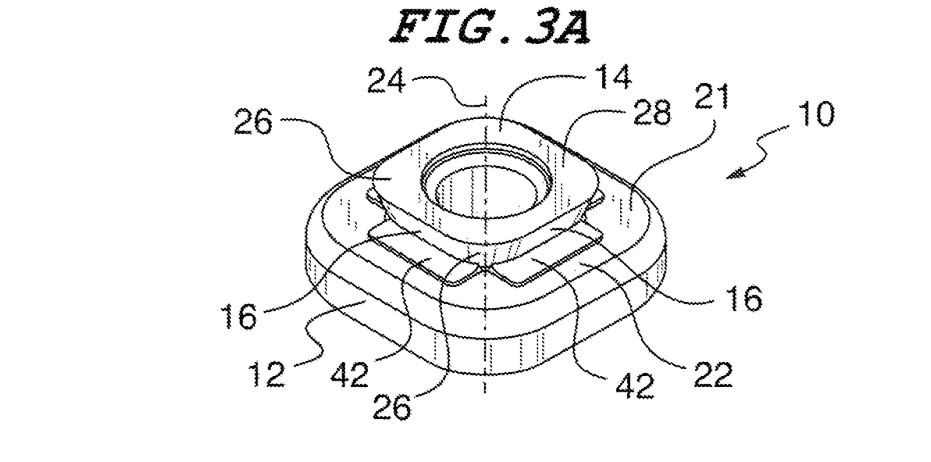
Figure 3B:
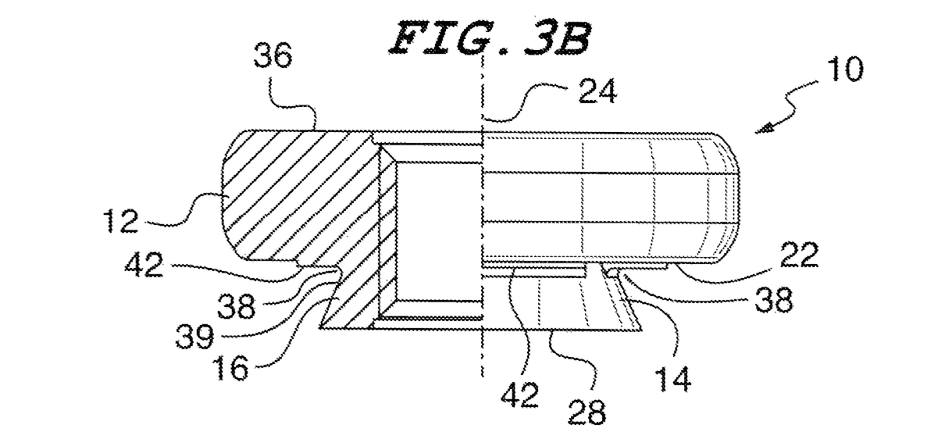
Figure 3C:
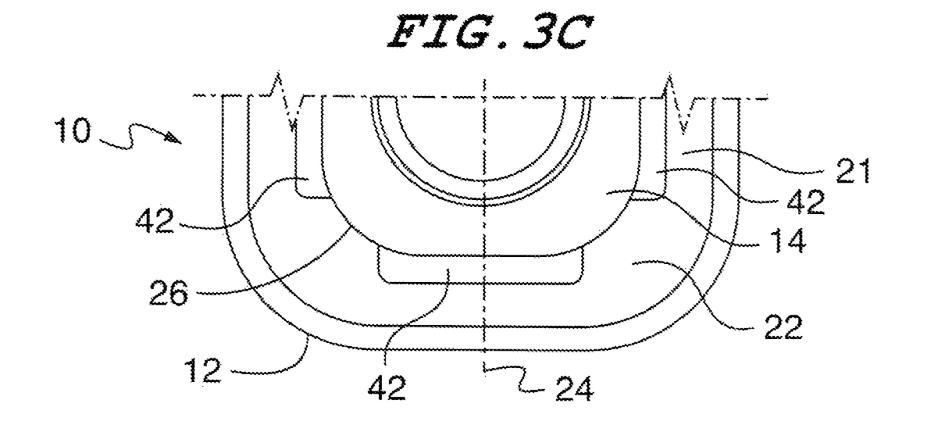
Figure 4A:
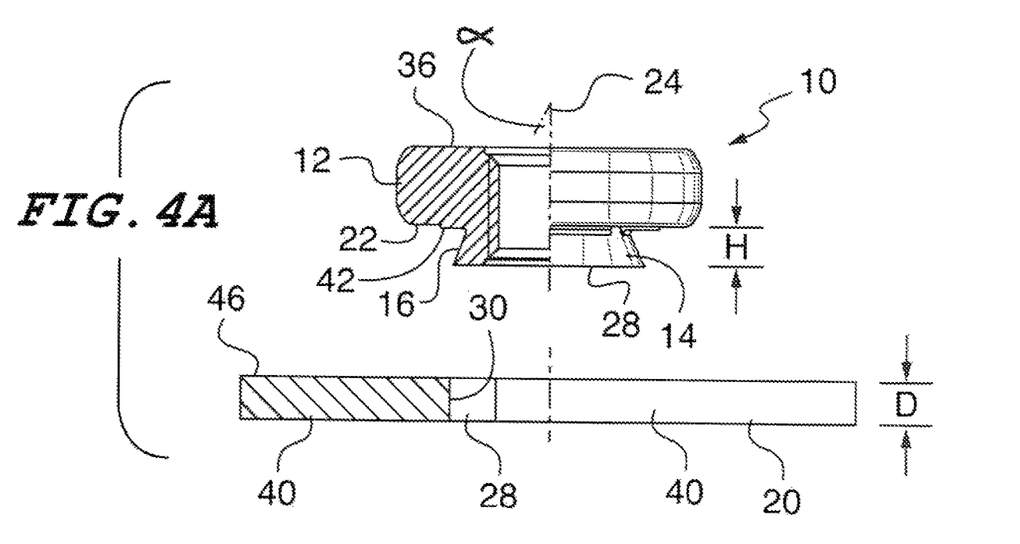
Figure 4B:
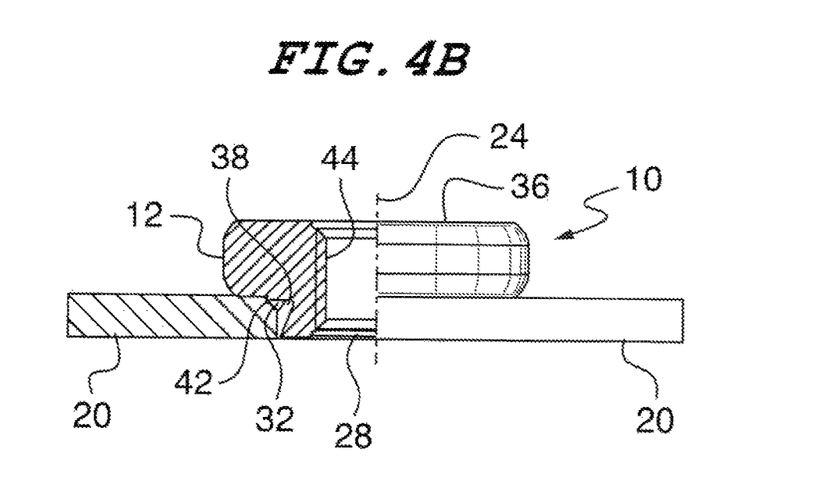

A self-piercing method for the manufacture of a component assembly in accordance with the invention will now be explained and indeed with regard to a press-in element in the shape of a nut element in accordance with FIGS. 3A to 3C. The nut element 10 here has a collar 14 with a polygonal piercing shape at the lower side 22 of the nut element 10. The dimension between the piercing region of the nut element at the free end face 28 of the collar 14 and the lower side 21 of the head part 12 is larger than the material thickness of the component 20 into which the nut element is introduced. The polygonal shape of the nut pierces an aperture which is sufficiently large for the function with transverse dimensions corresponding to those of the free end 28 of the collar 14.

After the piercing process the sheet metal material is caused to flow by the raised portions or displacement surfaces 42 which are located at the lower side of the nut element 10. This material serves for the axial locking of the nut element into the so pierced aperture 18 as explained several times earlier. Since however the piercing region of the nut element 10 is "free" the nut can be displaced in the x/y direction.

A flush attachment on an additional component is however not yet possible. Since the collar 14 of the nut element has an axial height which is larger than the thickness of the component 20.

In order to provide assistance here, a boss 70 is formed in the component whereby the projection 72 of the piercing region of the collar of the nut beyond the sheet metal part is compensated for and the possibility is provided for a flush screwed attachment of a further non-shown component to the lower side of the component outside of the boss 70 at the concave underside of the boss.

The boss 70 is itself formed in that a hold down member 82 of the setting head 77 is provided with a cut out 78 the shape of which corresponds to that of the boss at the outside of the sheet metal part. The die button 74 is provided with a cylindrical projection 75 which corresponds to the shape of the boss 70 at the underside of the sheet metal part. The hold down member 82 is biased downwardly by spring force and first of all clamps the sheet metal part 20 against the die button during the closing of the press in which the setting head 77 and the die button 74 are incorporated, whereby the boss is formed first of all. On increasing closing of the press the plunger 80 is pressed downwardly and presses the press-in element, which is located in the plunger passage inside the hold down member and beneath the plunger, against the sheet metal part 20 and in this way punches a slug out of the sheet metal part approximately at the center of the boss. During the punching operation the hold down member 82 deflects so to say backwardly against the spring bias relative to the plunger 80.

Figure 9:
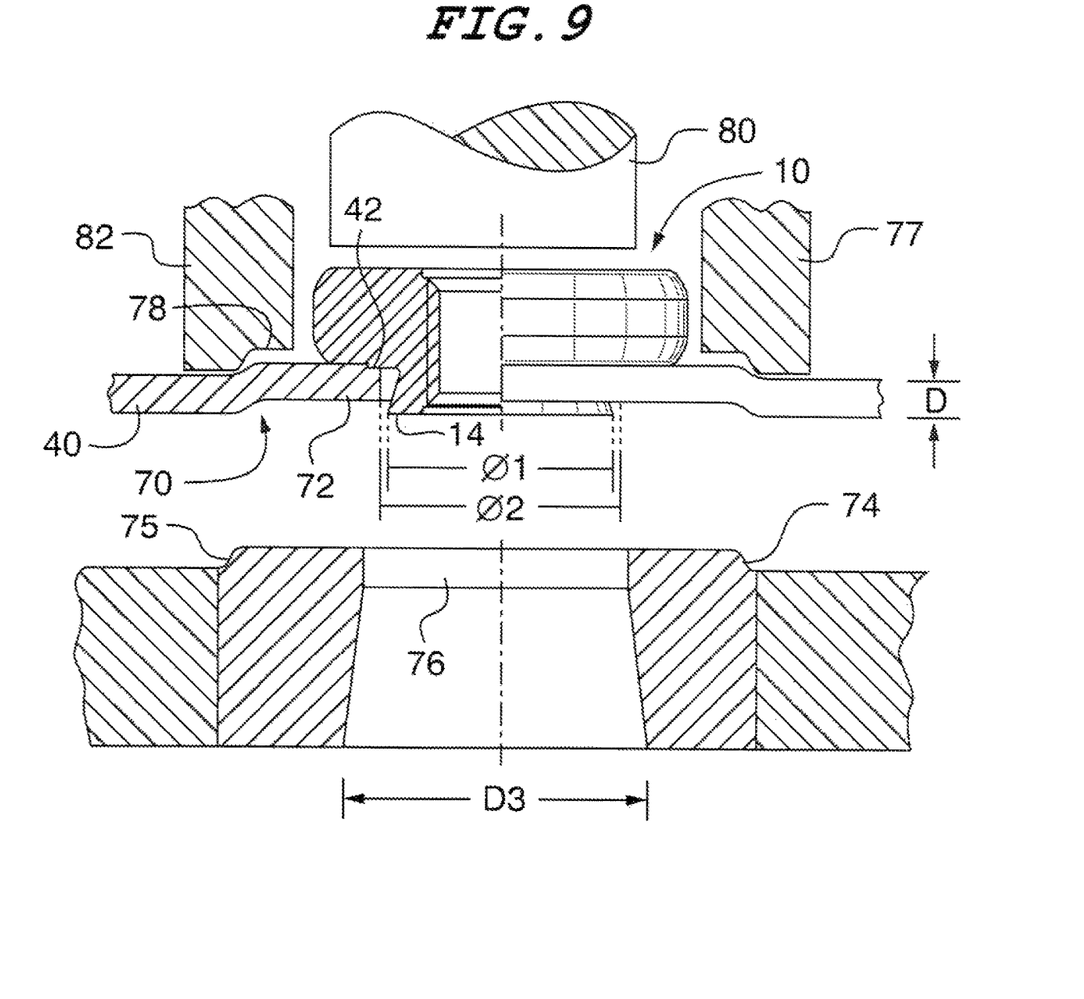

FIG. 9 shows the situation after the nut has been inserted and the component assembly has been lifted in a press prior to removal from the press.

The method described here for the manufacture of the component assembly can be considered in such a way that a setting head or punching head 77, which is well known per se and of which only some components are shown in FIG. 9 is used to insert the press-in element in self piercing manner into the component 20. For this purpose the free end 28 of the collar 14 is used, by the exertion of pressure onto the head part of the press-in element 10 by a plunger 80 of the setting head 77 and with simultaneous support of the component 20 on the piercing die 74 with a non-circular central opening 76, to pierce a non-circular aperture 18 in the component 20. The non-circular aperture 18 has a shape corresponding to the free end face of the press-in element 10.

It is particularly favorable when the non-circular aperture 76 of the die button 74 is provided with transverse dimensions $\varphi 2$ which are selected to be somewhat larger than the corresponding transverse dimensions $\varphi 1$ of the free end face 28 of the collar 14. In this way the corresponding sidewalls of the pierced aperture 18 of the component 20 are made to diverge in the direction of the central longitudinal axis of the press-in element 10 away from the head part 12, at least in the lower region of the sheet metal part remote from the head part 12.

In other words, the downwardly diverging aperture 18 is made using a piercing punch (with the free end face 28 of the collar 14) in combination with a die button 74 having an opening 76 with larger cross-sectional dimensions.

A design of this kind results in the hole punch (the free end face 28 of the collar 14) initially cutting a smooth wall aperture (with walls generally parallel to the central longitudinal axis) at the start of the aperture 18 and then subsequently breaking a piercing slug (not shown) of divergent shape out of the remaining thickness of the sheet metal part, with the maximum diameter of the piercing slug being determined by the diameter of the aperture 76 of the die button 74. The degree of divergences of the piercing slug is determined by the sheet metal thickness, by the transverse dimensions of the free end 28 of the collar 14 and by the cross-sectional dimensions of the aperture 76 of the die button. In this way, the alignment movement of the press-in element in the component 20 can be enlarged, which is of advantage.

REFERENCE NUMERAL LIST 10 press-in element
12 head part
14 collar
16 outer surfaces or flanks of the collar 14
18 polygonal aperture
20 panel, component or sheet metal part
21 component contact surface of sheet metal contact surface
22 lower side of the head part 12
24 central longitudinal axis of the press-in element
26 rounded corners of the collar 14
28 free end face of the collar 14
30 side flanks of the aperture 18

32 lip at the margin of the aperture 18 or raised marginal region
32' lip resulting from pressing flat of the lip 32
34 inner flank of the lip 32
36 upper end face of the head part
38 recesses, notches
39 base of the recesses or notches
40 lower side of the component or of the sheet metal part 20
41 free space
42 displacement surfaces at the head part 12
44 internal thread, external thread, thread cylinder
46 upper side of the sheet metal part 20
48 die button
50 ring-like raised portion of the die button 48
52 ring recess
54 shaft part
56 elliptical cross-sectional shape
58 main axis of the ellipse
60 minor axis of the ellipse
62 ice cream container-like cross-sectional shape
64 central region of the ice cream container-like cross-sectional shape
66 semicircular extensions of the central region 64
68 sides of central region 64
70 boss
72 projection
74 piercing die
75 cylindrical projection of the piercing die 74
76 the aperture of the piercing die 74
77 setting head
78 cylindrical recess at the end face of the setting head
80 plunger of the setting head
82 hold down member of the setting head 77
β angle
H axial height of the collar 14
D thickness of the panel 20
α angle
φ1 transverse dimension of the non-circular collar 14 at the free end 28
φ1 transverse dimension of the non-circular aperture 76 of the die button

The invention claimed is:

1. A component assembly comprising a component (20) and an element (10) formed as an alignment element attached to the component, the element having a head part (12), a component contact surface (21) at one end face (22) of the head part (12) and a collar arranged inside the component contact surface and projecting away from it, the collar having a cross-sectional shape which is not circular, wherein the collar (14) is inserted with clearance in an aperture of the component shaped complementary to the cross-sectional shape of the collar, wherein the collar (14) has outer surfaces which converge in the direction towards the said end face (22) of the head part and with respect to the central longitudinal axis of the element form an acute angle (α) with the latter, wherein the marginal region of the aperture of the component adjacent to the component contact surface extends into recesses (38) formed between the collar (14) and the end face (22) of the head part (12) but does not extend to the base (39) of the recesses (38), with a free space (41) arising which ensures a lateral alignment movement of the element relative to the component (20) and wherein an axial separation of the element (10) from the component (20) is prevented by material overlap of the component material with the collar (14) within the recesses (38); and wherein a ring recess (52) is provided in the side of the component (20) remote from the component contact surface (22) of the head part around the aperture (18) or wherein the discrete recesses are provided which are arranged in a ring in the side of the component remote from the component contact surface of the head part and is or are at least co-responsible for the displacement of the component material into the recesses (38).

2. A component assembly comprising a component (20) and an element (10) formed as an alignment element attached to the component, the element having a head part (12), a component contact surface (21) at one end face (22) of the head part (12) and a collar arranged inside the component contact surface and projecting away from it, the collar having a cross-sectional shape which is not circular, wherein the collar (14) is inserted with clearance in an aperture of the component shaped complementary to the cross-sectional shape of the collar, wherein the collar (14) has outer surfaces which converge in the direction towards the said end face (22) of the head part and with respect to the central longitudinal axis of the element form an acute angle (α) with the latter, wherein the marginal region of the aperture of the component adjacent to the component contact surface extends into recesses (38) formed between the collar (14) and the end face (22) of the head part (12) but does not extend to the base (39) of the recesses (38), with a free space (41) arising which ensures a lateral alignment movement of the element relative to the component (20) and wherein an axial separation of the element (10) from the component (20) is prevented by material overlap of the component material with the collar (14) within the recesses (38) wherein the end face (22) of the head part adjacent the collar (14) has projecting displacement surfaces (42) at least at the positions of the side surfaces (16) of the collar (14), which are provided to displace component material in the edge region of the aperture (18), with the displace component material forming noses which project inwardly into the recesses (38) formed between the side surfaces (16) of the collar (14) and the said end face (22) of the head part (12) or the displacement surfaces (42) and prevent the axial separation of the element (10) and the component (20) by radial overlap.

3. A component assembly in accordance with claim 1 or claim 2, wherein the collar (14) has an oval or elliptical cross-sectional shape or a cross-sectional shape resembling an ice cream container.

4. A component assembly in accordance with claim 1 or claim 2, wherein the axial height (H) of the collar does not exceed the axial thickness (D) of the component (20) in the region of the attachment of the element (10) or wherein the axial height (H) of the collar (14) exceeds the axial thickness (D) of the component and the collar (14) is arranged in a recess (70) of the component in the region of attachment of the element (10).

5. A component assembly in accordance with claim 1 or claim 2, wherein the acute angle (α) lies in the range from about 20° to about 40°.

6. A component assembly in accordance with claim 1 or claim 2, wherein the head part (12) is also polygonal or elliptical in cross-section.

7. A component assembly in accordance with claim 1 or claim 2, wherein it is either formed as a nut element and has a central longitudinal passage or is formed as a bolt element with a shaft part (54) projecting away from the collar (14) in the direction away from the head part (12).

8. A component assembly in accordance with claim 2 or claim 1, wherein the said component contact surface (21) of the head part (12) lies in a plane perpendicular to the central longitudinal axis (24) of the element (10).

9. A component assembly in accordance with claim 1 or claim 2, wherein the component is a sheet metal part.

10. An element (10) which is adapted for use in a component assembly in accordance with at least claim 1.

11. A method of manufacturing a component assembly in accordance with at least claim 1 or claim 2, wherein a non-circular aperture (18) is pre-formed in the component (20) having transverse dimensions larger than the corresponding maximum transverse dimensions of the collar (14) in the region of its free end face (28), so that the collar can be introduced into the non-circular aperture (18), wherein component material is displaced from the marginal region of the non-circular aperture (18) into the recesses (38) formed between the side surfaces (16) of the collar (14) and the component contact surface (21) of the head part, with the component material not being displaced sufficiently far that it extends to the base (30) of the recesses (38), whereby the lateral alignment movement of the element (10) relative to the component (20) is ensured, but extends sufficiently far that an axial separation of the element (10) from the component (20) is prevented as a result of the material overlap of the component material with the non-circular collar (14) inside the recesses (38).

12. A method for the manufacture of a component assembly in accordance with at least claim 1, wherein, by the exertion of pressure on the head part (12) of the element and with a simultaneous support of the component (20) on a die button (74) having a non-circular central aperture, the free end face (20) of the collar (14) which is non-circular in cross-section is used in order to punch a non-circular aperture in the component (20).

13. A method in accordance with claim 12, wherein the non-circular aperture (74) of the die button is provided with cross-sectional dimensions somewhat larger than the corresponding cross-sectional dimensions of the free end face (28) of the collar (14) so that the sidewalls of the so punched aperture (18) of the component (20) are divergent in the direction of the central longitudinal axis (24) of the element (10) and in the direction away from the head part (12) at least in the region remote from the head part (12).

14. A component assembly in accordance with claim 1 or claim 2, wherein the collar (14) has an at least substantially polygonal cross-sectional shape, with the polygonal cross-sectional shape of the collar (14) and accordingly of the polygonal aperture (18) of the component (20) being selected from the group triangular, square, pentagonal and hexagonal.

15. A method in accordance with claim 11, wherein the preformed non-circular aperture (18) of the components (20) is provided with a raised marginal region (32) at the side (46) confronting the component contact surface (21) of the head part (12) and wherein the raised marginal region (32) is pressed flat on introducing the collar (14) into the component (20) by the said component contact surface (21) of the head part, while the side of the component (20) remote from the head part is simultaneously supported in order to hereby bring about the displacement of the component material in the marginal region.

16. A method in accordance with claim 11, wherein the marginal region of the preformed non-circular aperture (18) of the component (20) which lies in one plane in the region of the attachment is impressed by means of displacement surfaces (42) which are provided at the component contact surface (21) of the head part, at least in the region of the side surfaces (16) of the collar (14) on introduction of the collar (14) into the component (20), with the underside (40) of the component being simultaneously supported, in order to hereby bring about the displacement of the component material in the marginal region of the non-circular aperture (18).

17. A method in accordance with claim 11, wherein, by means of a die (48) which is provided with a raised ring (50) or with discrete projections arranged in a ring, a ring recess (52) or discrete recesses which are arranged in a ring is or are provided at the side of the component (20) remote from the component contact surface (21) of the head part (12) around the non-circular aperture (18) and is or are responsible for the displacement of the component material into the recesses (38).

* * * * *